US010043466B2

(12) United States Patent
Ishibashi et al.

(10) Patent No.: US 10,043,466 B2
(45) Date of Patent: Aug. 7, 2018

(54) DISPLAY DEVICE

(71) Applicant: Mitsubishi Electric Corporation, Tokyo (JP)

(72) Inventors: Kenichiro Ishibashi, Kumamoto (JP); Yuichi Masutani, Kumamoto (JP); Katsuaki Murakami, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/716,173

(22) Filed: May 19, 2015

(65) Prior Publication Data

US 2015/0348480 A1 Dec. 3, 2015

(30) Foreign Application Priority Data

May 29, 2014 (JP) ................................ 2014-110765

(51) Int. Cl.

*G06F 3/038* (2013.01)
*G09G 3/36* (2006.01)

(52) U.S. Cl.

CPC ... *G09G 3/3648* (2013.01); *G09G 2300/0426* (2013.01); *G09G 2330/10* (2013.01); *G09G 2330/12* (2013.01)

(58) Field of Classification Search

CPC ....... G09G 2300/0426; G09G 2330/10; G09G 2330/12

(Continued)

(56) References Cited

U.S. PATENT DOCUMENTS 5,298,891 A * 3/1994 Plus ..................... G02F 1/1362 345/93
6,697,037 B1 * 2/2004 Alt ....................... G02F 1/1309 345/206

(Continued)

FOREIGN PATENT DOCUMENTS

JP H05-113579 A 5/1993
JP H05-313200 A 11/1993

(Continued)

OTHER PUBLICATIONS

An Office Action; "Notification of Reasons for Refusal," issued by the Japanese Patent Office on Mar. 13, 2018, which corresponds to Japanese Patent Application No. 2014-110765 and is related to U.S. Appl. No. 14/716,173; with English language translation.

(Continued)

*Primary Examiner* — Kumar Patel
*Assistant Examiner* — Kuo Woo
(74) *Attorney, Agent, or Firm* — Studebaker & Brackett PC

(57) ABSTRACT

A plurality of source signal lines extend parallel to each other. Gate signal lines extend parallel to each other while crossing the plurality of source signal lines. A pixel switching element is provided at an intersection of each of the source signal lines and each of the gate signal lines. Driving terminals receive signals to be input to the plurality of source signal lines. Leading lines connect the plurality of driving terminals and the plurality of source signal lines in one to one relationship. A repairing line has a conductive part extending parallel to the plurality of leading lines. An end part of one leading line or each of more leading lines near the source signal line and the driving terminal corresponding to this one or each of these leading lines can become connected through this conductive part.

11 Claims, 8 Drawing Sheets

(58) Field of Classification Search
USPC .......................................... 345/206, 93, 205
See application file for complete search history.

(56) References Cited

U.S. PATENT DOCUMENTS

| | | | | |
|---|---|---|---|---|
| 9,164,337 | B1 * | 10/2015 | Chen ................. | G02F 1/136259 |
| 2005/0078235 | A1 | 4/2005 | Ozaki et al. | |
| 2005/0195338 | A1 | 9/2005 | Matsumoto et al. | |
| 2006/0124966 | A1 | 6/2006 | Oh et al. | |
| 2007/0040794 | A1 * | 2/2007 | Kwak ............... | G02F 1/136259 345/100 |
| 2007/0195030 | A1 * | 8/2007 | Huang ............. | G02F 1/136259 345/87 |
| 2009/0033822 | A1 * | 2/2009 | Chung ............. | G02F 1/136259 349/54 |
| 2011/0134089 | A1 * | 6/2011 | Ozeki ............... | G02F 1/136259 345/205 |
| 2014/0104251 | A1 * | 4/2014 | Zhang .................. | G09G 3/3611 345/205 |

FOREIGN PATENT DOCUMENTS

| | | | |
|---|---|---|---|
| JP | H9-33937 | A | 2/1997 |
| JP | H10-253978 | A | 9/1998 |
| JP | 2001-147649 | A | 5/2001 |
| JP | 2001-166704 | A | 6/2001 |
| JP | 2002-258315 | A | 9/2002 |
| JP | 2005-249993 | A | 9/2005 |
| JP | 2006-171672 | A | 6/2006 |

OTHER PUBLICATIONS

An Office Action mailed by the Japanese Patent Office dated Jun. 12, 2018, which corresponds to Japanese Patent Application No. 2014-110765 and is related to U.S. Appl. No. 14/716,173.

* cited by examiner

DISPLAY DEVICE

FIELD OF THE INVENTION

The present invention relates to a display device, more particularly to a repairing technique of recovering a function of a signal line.

BACKGROUND ART

A display device has an array substrate. The array substrate has a transparent substrate on which a circuit to apply a display voltage to each pixel is formed. In this array substrate, a defect in a line occurring in a manufacturing step might be a point defect or a linear defect on a display screen. In response, a short-circuit developed between adjacent lines (short-circuit defect) is repaired by cutting and removing a part of the short-circuit and making the lines function normally, for example. A break in a line (breaking defect) is repaired by connecting a part of the break and making the line function normally.

Various methods have been implemented to repair a breaking defect. Meanwhile, ensuring reliability and handling interconnection resistance of a repaired site (repaired part) have been big issues to be solved. Additionally, various considerations have been given on a method of reducing space on the array substrate required for repair or a method of minimizing influence of a repaired part on a product.

A method of repairing a breaking defect occurring in a line on the array substrate is described for example in Japanese Patent Application Laid-Open Nos. 2001-166704 and 9-033937 (1997). According to Japanese Patent Application Laid-Open No. 2001-166704, the number of preliminary lines to be used for repair is reduced. According to Japanese Patent Application Laid-Open No. 9-033937, a repaired part is covered with a seal to avoid an influence of sputter or projection of metal or leakage of light to occur during repair.

Japanese Patent Application Laid-Open Nos. 2001-166704 and 9-033937 are intended to repair a defect in a line in a display region.

Meanwhile, in a display device of recent years, particularly of a type employing COG (chip on glass) mounting, a line from a driver IC to a display region (hereinafter called a leading line) has been thinned considerably in response to higher density of driver ICs and a narrower frame. This makes the occurrence of a break in the leading line likely. Even if the leading line is not broken completely during manufacture, the leading line is still exposed to the danger of a line defect (partial breaking defect) that might lead to a break due to stress such as collision.

Such a defect in a line may be detected during a manufacturing step by an optical defect inspection system (automatic optical inspection: AOI) or an electric defect inspection system (array tester).

However, the leading line cannot be repaired by the techniques of Japanese of Patent Application Laid-Open Nos. 2001-16674 and 9-033937. Additionally, according to Japanese Patent Application Laid-Open Nos. 2001-16674 and 9-033937, repairing lines extend along opposite sides of a display region. This makes the repairing lines long, leading to increase in a resistance value.

SUMMARY OF THE INVENTION

It is an object to provide a display device capable of recovering a function of a leading line at a low resistance.

A display device includes a plurality of first signal lines, a plurality of second signal lines, a pixel switching element, a plurality of driving terminals, a plurality of leading lines, a repairing line. The plurality of first signal lines extend parallel to each other. The plurality of second signal lines extend parallel to each other while crossing the plurality of first signal lines. The pixel switching element is provided at an intersection of each of the first signal lines and each of the second signal lines. The plurality of driving terminals receive signals to be input to the plurality of first signal lines. The plurality of leading lines connect the plurality of driving terminals and the plurality of first signal lines in one to one relationship. The repairing line includes a conductive part extending along with the plurality of leading lines and is capable of electrically connecting at least one of the plurality of driving terminals and at least one of the plurality of leading lines at the plurality of first signal lines side thereof, through the conductive part. The at least one of the driving terminals and the at least one of the plurality of leading lines is corresponding to each other.

According to this display device, if a break occurs in one of the more leading lines, a function of this leading line can be recovered by a process of connecting an end part on the first signal lines side and an end part on the of the driving terminals side of this leading line through the repairing line.

The length of the repairing line is reduced, as comparing to a structure in which a repairing line connects the first signal line and one of the leading lines. As a result, a function of a leading line can be recovered at a low resistance.

These and other objects, features, aspects and advantages of the present invention will become more apparent from the following detailed description of the present invention when taken in conjunction with the accompanying drawings.

EMBODIMENT FOR CARRYING OUT THE INVENTION

First Embodiment

Figure 1:
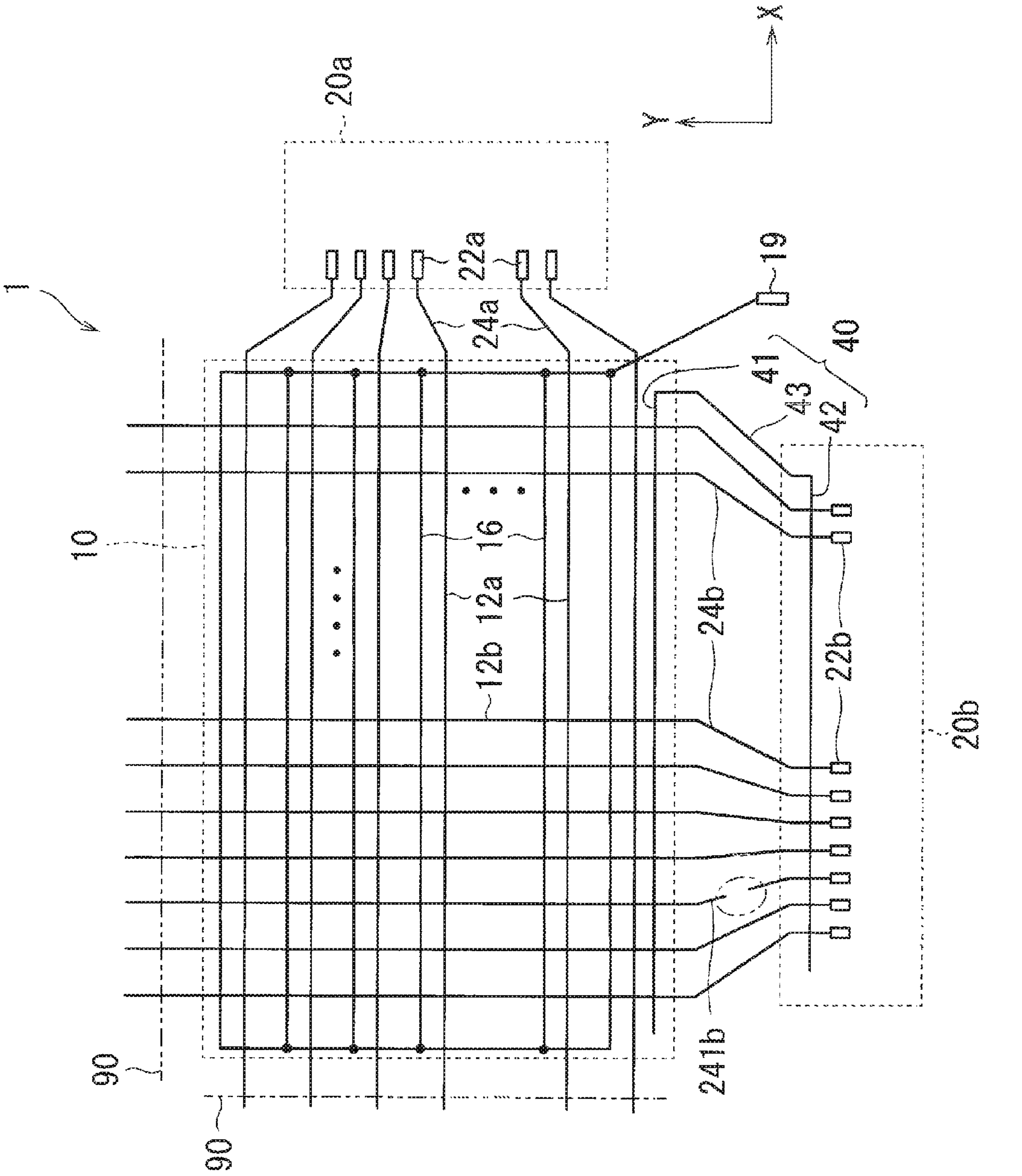
FIG. 1 conceptually shows an example of a circuit structure of a display device.

FIG. 1 conceptually shows an example of the structure of a circuit formed on an array substrate 1 according to a first embodiment. The array substrate 1 is used in a display device (such as a liquid crystal display device).

The array substrate 1 has a substrate (such as a transparent substrate, more specifically, a glass substrate, for example) not shown in the drawings. Various components described later are formed on this substrate. As shown in FIG. 1, the array substrate 1 of the first embodiment includes a display region 10, a semiconductor chip mounting region 20*a*, and a semiconductor chip mounting region 20*b*.

The display region 10 includes a plurality of gate signal lines 12*a* and a plurality of source signal lines 12*b*. The plurality of gate signal lines 12*a* extend parallel to each other. In the below, a direction where the gate signal lines 12*a* extend is called an X direction. The plurality of source signal lines 12*b* extend parallel to each other while crossing the plurality of gate signal lines 12*a*. The source signal lines 12*b* extend in a Y direction substantially orthogonal to the X direction, for example.

In the illustration of FIG. 1, the array substrate 1 is provided with a plurality of common lines 16. The plurality of common lines 16 extend in the X direction. Each of the common lines 16 is placed adjacent to one gate signal line 12*a* and spaced apart from this gate signal line 12*a*. The plurality of common lines 16 are connected to each other at respective ends on one side and respective ends on the opposite side of the X direction. In the illustration of FIG. 1, the array substrate 1 is further provided with a common line terminal 19. The common line terminal 19 is connected to the common lines 16. A common potential is applied to the common lines 16 through the common line terminal 19.

Figure 2:
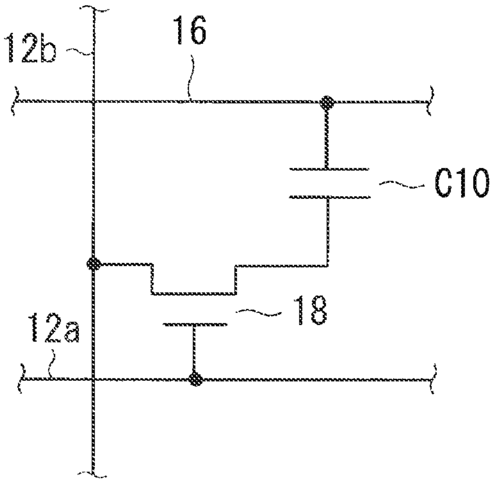
FIG. 2 conceptually shows a circuit structure of a part corresponding to one pixel.

Regions each surrounded by one gate signal line 12*a* and one source signal line 12*b* correspond to respective pixels. These pixels are arranged in a matrix as a whole, for example. FIG. 2 shows a more specific example of a circuit structure in one pixel. As shown in FIG. 2, a pixel switching element (here, a TFT (thin film transistor) for display purposes) 18 is formed at an intersection of the gate signal line 12*a* and the source signal line 12*b*. The pixel switching element 18 has a control electrode (gate electrode) connected to the gate signal line 12*a* and a source electrode connected to the source signal line 12*b*. The pixel switching element 18 has a drain electrode connected to a pixel electrode not shown in the drawings. This pixel electrode is connected to the common line 16 through a storage capacitor C10. The pixel electrode is to apply a voltage to a display element (such as a liquid crystal). The pixel switching element 18 makes the source signal line 12*b* and the pixel electrode either electrically continuous or discontinuous with each other.

In response to input of a signal to the gate signal line 12*a*, the pixel switching element 18 is turned on. If a signal is input to the source signal line 12*b* in this state, the storage capacitor C10 is charged with a voltage. The voltage for charging the storage capacitor C10 corresponds to a voltage to be applied to a pixel (more specifically, a display element such as a liquid crystal corresponding to this pixel). Display by the display element changes in response to this voltage.

In the illustration of FIG. 1, the pixel switching element 18 and the storage capacitor C10 are omitted in order for the structure to be recognized more easily. The circuit of FIG. 2 is formed at each of intersections of the plurality of gate signal lines 12*a* and the plurality of source signal lines 12*b*, for example. These circuits as a whole are arranged in a matrix, for example.

Each of the semiconductor chip mounting regions 20*a* and 20*b* is a region where a semiconductor chip (such as a gate driver (gate driver IC) or a source driver (source drive IC)) is mounted. As an example, a gate driver (not shown in the drawings) to output a signal to the gate signal line 12*a* is mounted in the semiconductor chip mounting region 20*a* and a source driver (not shown in the drawings) to output a signal to the source signal line 12*b* is mounted in the semiconductor chip mounting region 20*b*.

The semiconductor chip mounting region 20*a* includes a plurality of driving terminals 22*a*. The driving terminals 22*a* are for example juxtaposed in the Y direction. Each of the driving terminals 22*a* is connected to the gate signal line 12*a* through a leading line 24*a*. Specifically, the leading line 24*a* connects the gate signal line 12*a* and the driving terminal 22*a*. The plurality of driving terminals 22*a* are further connected to a plurality of output terminals (output bumps) of the gate driver. As a result, the gate driver and the gate signal lines 12*a* are electrically connected through the driving terminals 22*a* and the leading lines 24*a*.

A set of the gate signal line 12*a* and the leading line 24*a* form one line. The leading line 24*a* mentioned herein corresponds to a part of this line between the pixel switching element 18 nearest the driving terminal 22*a* and this driving terminal 22*a*.

The semiconductor chip mounting region 20*b* includes a plurality of driving terminals 22*b*. The driving terminals 22*b* are for example juxtaposed in the X direction. Each of the driving terminals 22*b* is connected to the source signal line 12*b* through a leading line 24*b*. Specifically, the leading line 24*b* connects the source signal line 12*b* and the driving terminal 22*b*. The plurality of driving terminals 22*b* are further connected to a plurality of output terminals (output bumps) of the source driver. As a result, the source driver and the source signal lines 12*b* are electrically connected through the driving terminals 22*b* and the leading lines 24*b*.

A set of the source signal line 12*b* and the leading line 24*b* form one line. The leading line 24*b* mentioned herein forms a part of this line between the pixel switching element 18 nearest the driving terminal 22*b* and this driving terminal 22*b*.

In the illustration of FIG. 1, a gap between the source signal lines 12*b* is wider than a gap between the driving terminals 22*b*. This makes a gap between the leading lines 24*b* wider in a position closer to the source signal lines 12*b*. In the illustration of FIG. 1, the leading lines 24*b* each include a terminal side part extending in the Y direction near the driving terminal 22*b*, a tilted part extending so as to get farther away from the adjacent leading line 24*b* in a position closer to the source signal line 12*b*, and a signal line side part extending in the Y direction near the source signal line 12*b*.

Figure 3:
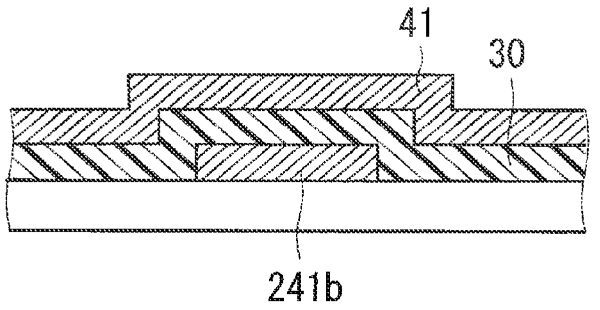
FIGS. 3 and 4 are sectional views each conceptually showing a source signal line and a repairing line.

The array substrate 1 is provided with a repairing line 40. The repairing line 40 includes a conductive part (hereinafter also called a repairing line) 43 extending parallel to the plurality of leading lines 24*b*. An end part of the leading line 24*b* near the source signal line 12*b* and the driving terminal 22*b* corresponding to this leading line 24*b* can become connected through the part 43. The repairing line 40 is formed of a repairing line 41, a repairing line 42, and the repairing line 43, for example. The repairing line 41 extends near the source signal lines 12*b* so as to cross one or more leading lines 24*b*. As an example, the repairing line 41 extends in the X direction and crosses all the leading lines 24*b*. In the illustration of FIG. 1, the repairing line 41 crosses a part of the leading line 24*b* (signal line side part) extending in the Y direction near the source signal line 12*b*. As shown in FIG. 3, an insulating layer 30 is interposed between the repairing line 41 and the leading line 24*b*.

As a result of repairing process described later, the repairing line 41 can become electrically connected to each of the leading lines 24*b*.

As a result of repairing process described later, the repairing line 42 can become electrically connected to the aforementioned one or more leading lines 24*b* in a position closer to the driving terminals 22*b* than the repairing line 41. More specifically, the repairing line 42 extends for example in the X direction in a position closer to the driving terminals 22*b* than the repairing line 41. The repairing line 42 crosses all the leading lines 24*b*. The repairing line 42 extends near the driving terminals 22*b*. In the illustration of FIG. 1, the repairing line 42 crosses a part of the leading line 24*b* (terminal side part) extending in the Y direction near the driving terminal 22*b*. The insulating layer 30 is further interposed between the repairing line 42 and the leading line 24*b*.

The repairing line 43 connects the repairing lines 41 and 42. In the illustration of FIG. 1, the repairing line 43 extends outside a region where the plurality of leading lines 24*b* are arranged. The repairing line 43 connects one end of the repairing line 41 and one end of the repairing line 42.

With the use of the repairing line 40, if a break occurs in one leading line 24*b* in a region between the repairing lines 41 and 42, a function of this leading line 24*b* can be recovered by given repairing process. As an example, FIG. 1 shows a break occurring in one leading line 241*b* of the leading lines 24*b*. A site of this break exists between the repairing lines 41 and 42 in a plan view.

Figure 4:
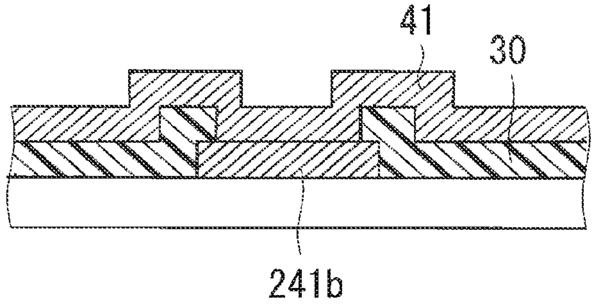

The insulation of the insulating layer 30 at an intersection of the leading line 241*b* and the repairing line 41 is broken to fuse the leading line 241*b* and the repairing line 41 at this intersection, thereby connecting the leading line 241*b* and the repairing line 41. This forms electrical connection between the leading line 241*b* and the repairing line 41 as illustrated in FIG. 4. This process can be conducted by applying a laser from outside, for example. As a result of the same repairing process, the leading line 241*b* and the repairing line 42 are electrically connected at an intersection of the leading line 241*b* and the repairing line 42.

As a result, electrical connection is formed through the repairing line 40 between the source signal line 12*b* and the driving terminal 22*b* connected to the leading line 241*b*. Thus, a signal can be output to the source signal line 12*b* after bypassing the site of the break in the leading line 241*b*.

Figure 5:
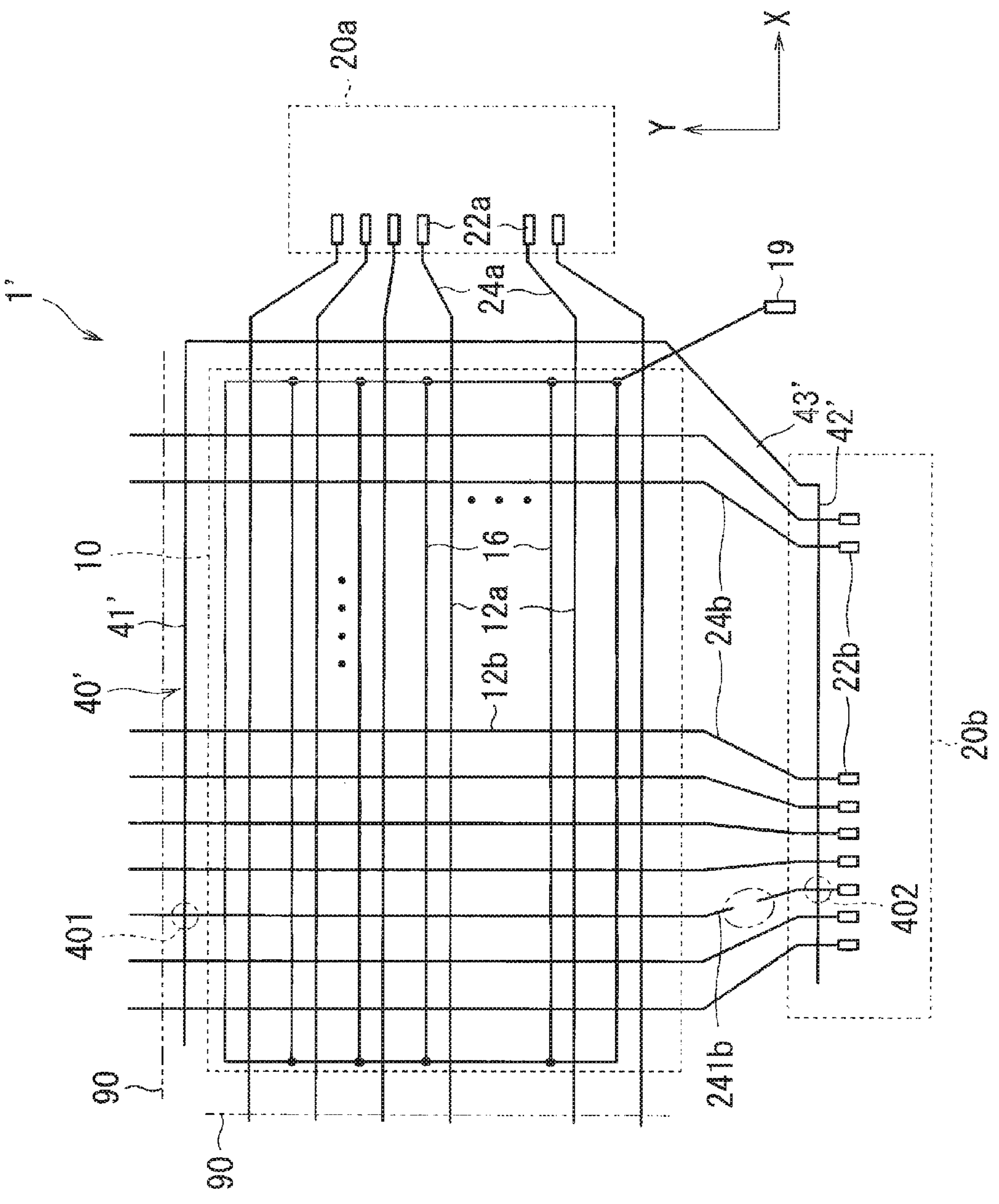
FIG. 5 conceptually shows an example of a circuit structure of a display device according to Comparative Example.

FIG. 5 shows Comparative Example. FIG. 5 conceptually shows an example of the structure of a circuit formed on an array substrate 1' according to Comparative Example. A repairing line 40' shown in FIG. 5 is formed of a repairing line 41', a repairing line 42', and a repairing line 43'. The repairing line 41' extends on the opposite side of the driving terminals 22*b* relative to the display region 10 so as to cross all the source signal lines 12*b*. An insulating layer is interposed between the repairing line 41' and the source signal line 12*b*.

Like the repairing line 42, the repairing line 42' extends near the driving terminals 22*b*. An insulating layer is interposed between the repairing line 42' and the leading line 24*b*.

The repairing line 43' extends for example in an area outside a region where the leading lines 24*b* are arranged and in an area outside the display region 10 and connects one end of the repairing line 41' and one end of the repairing line 42'. Thus, the repairing line 40' extends so as to surround the display region 10 from outside.

Even in the illustration of FIG. 5, if a break occurs in one leading line 241*b* in a region between the repairing lines 41' and 42', a function of the leading line 241*b* can still be recovered as a result of given repairing process. Specifically, by applying a laser, for example, the leading line 241*b* and the repairing line 42' are electrically connected and the source signal line 12*b* connected to the leading line 241*b* and the repairing line 41' are electrically connected. The illustration of FIG. 5 includes a connection 401 between the source signal line 12*b* and the repairing line 41' and a connection 402 between the leading line 241*b* and the repairing line 42'. Thus, a signal from the driving terminal 22*b* can be output to the source signal line 12*b* through the repairing line 40'.

Meanwhile, in the illustration of FIG. 5, the repairing line 41' crosses the source signal lines 12*b* on the opposite side of the leading lines 24*b* relative to the display region 10. This produces a relatively wide gap between the repairing lines 41' and 42', leading to a relatively great length of the repairing line 40' (a group of the repairing lines 41' to 43'). This increases a resistance value of the line, causing a delay of a signal to be input to the source signal line 12*b* through the repairing line 40'. As a result, the display performance of a screen displayed in the display region 10 is degraded.

In contrast, in the first embodiment, the repairing line 41 extends so as to cross the leading lines 24*b*. This makes a gap between the repairing lines 41 and 42 smaller than the gap between the repairing lines 41' and 42'. Specifically, the repairing line 40 (a group of the repairing lines 41 to 43) is shorter than the repairing line 40'. This allows recovery of the leading line 241*b* at a low resistance. This can suppress a signal delay, leading to suppression of degradation of the display performance.

In the aforementioned example, all the leading lines 24*b* are to be repaired with the repairing line 40. However, this is not construed as a limitation. One or more leading lines 24*b* may be targeted for repair with the repairing line 40. Specifically, what is required is to provide the repairing line 41 in a manner allowing the repairing line 41 to become electrically connected to one leading line 24*b* or each of more leading lines 24*b* as a result of repairing process, to provide the repairing line 42 in a manner allowing the repairing line 42 to become electrically connected to this leading line 24*b* or each of these leading lines 24*b* in a position closer to the driving terminals 22*b* than the repairing line 41 as a result of repairing process, and to form connection between the repairing lines 41 and 42.

In the aforementioned example, the repairing line 40 is provided for the leading lines 24*b*. A comparable repairing line may also be provided for the leading lines 24*a*.

Second Embodiment

Figure 6:
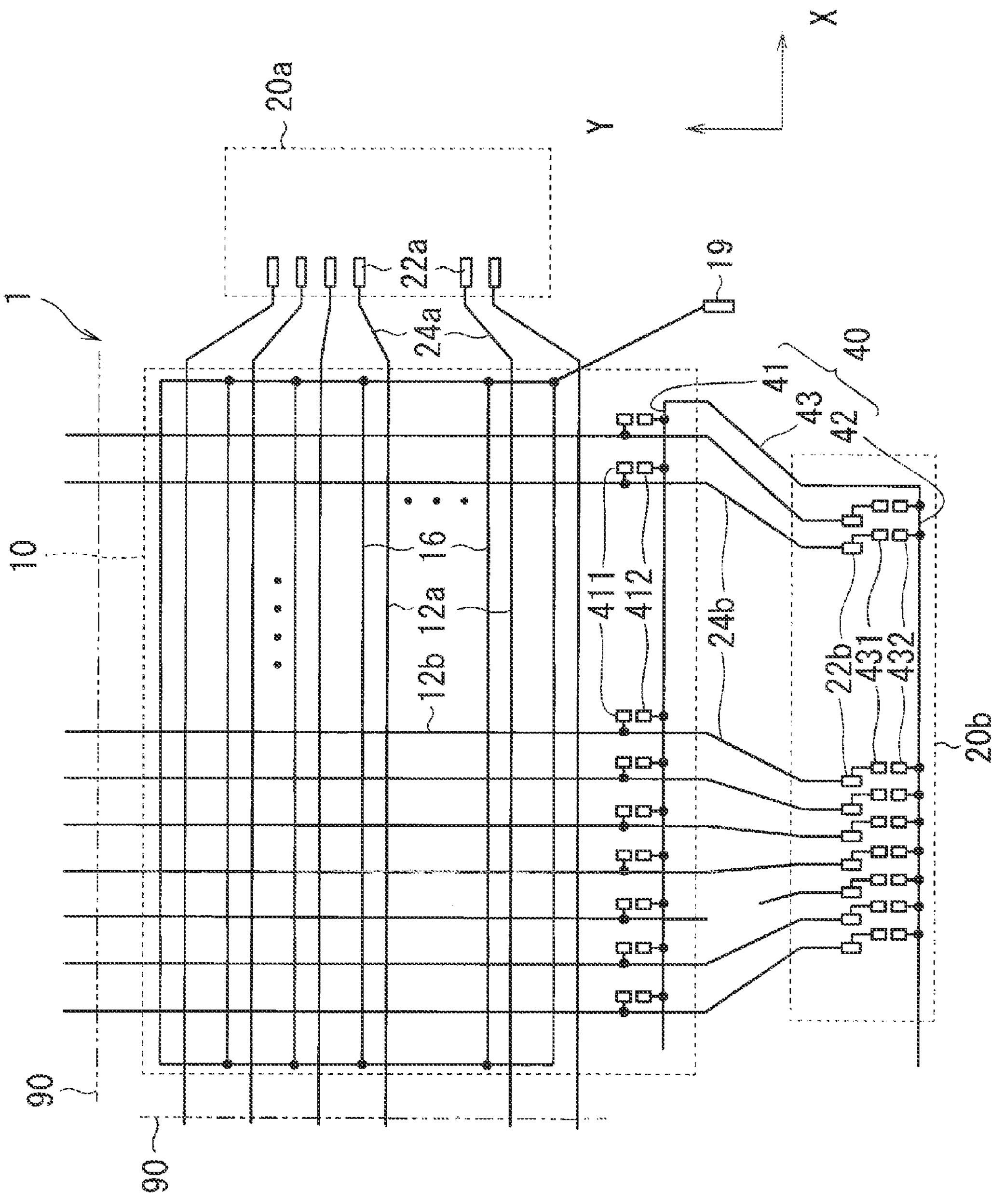
FIGS. 6 and 7 each conceptually show an example of the circuit structure of the display device.

FIG. 6 conceptually shows an example of the structure of a circuit formed on the array substrate 1 according to a second embodiment of the present invention. In comparison to the array substrate 1 of FIG. 1, the array substrate 1 of FIG. 6 further includes a repairing terminal 411, a repairing terminal 412, a repairing terminal 431, and a repairing terminal 432.

The repairing terminal 411 includes a plurality of repairing terminals 411, for example. Each of the repairing terminals 411 is connected to a corresponding one of the leading lines 24*b*. In the illustration of FIG. 6, all the leading lines 24*b* are provided with the respective repairing terminals 411. As an example, each repairing terminal 411 is connected to an end part of the leading line 24*b* near the source signal line 12*b* (part extending in the Y direction, for example).

The repairing terminal 412 is provided in corresponding relationship with the repairing terminal 411. The repairing terminal 412 is arranged near the corresponding repairing terminal 411. The repairing terminals 411 and 412 corresponding to each other form a pair and can become electrically connected to each other as a result of repairing process.

The repairing process is conducted for example as follows. A certain conductor (such as solder) is made to contact both the repairing terminals 411 and 412 corresponding to each other. Thus, the repairing terminals 411 and 412 can become electrically connected to each other. Forming the electrical connection between the repairing terminals 411 and 412 in this way forms electrical connection between the leading line 24*b* and the repairing line 41.

The repairing terminal 431 includes a plurality of repairing terminals 431, for example. Each of the repairing terminals 431 is connected to a corresponding one of the leading lines 24*b*. In the illustration of FIG. 6, each repairing terminal 431 is connected to the driving terminal 22*b* and is connected to the leading line 24*b* through the driving terminal 22*b*. The repairing terminal 431 is not always required to become connected to the driving terminal 22*b*. The repairing terminal 431 is required only to be connected to the leading line 24*b* in a position closer to the driving terminal 22*b* than a connecting point between the repairing terminal 411 and the leading line 24*b*. As an example, the repairing terminal 431 may become connected to a part of the leading line 24*b* extending in the Y direction near the driving terminal 22*b*.

These repairing terminals 431 are provided to the leading lines 24*b* connected to the repairing terminals 411. In the illustration of FIG. 6, the repairing terminals 411 are provided to all the leading lines 24*b*. Thus, the repairing terminals 431 are also provided to all the leading lines 24*b*.

The repairing terminal 432 is provided in corresponding relationship with the repairing terminal 431. The repairing terminal 432 is arranged near the corresponding repairing terminal 431. The repairing terminals 431 and 432 corresponding to each other form a pair and can become electrically connected to each other as a result of repairing process described later. Forming the electrical connection between the repairing terminals 431 and 432 forms electrical connection between the driving terminal 22*b* and the repairing line 42.

The repairing process is conducted for example as follows. A certain conductor (such as solder) is made to contact both the repairing terminals 431 and 432 in a pair. This can form the electrical connection between the repairing terminals 431 and 432.

The size, material, shape, and surface condition (such as surface accuracy) of the repairing terminals 411, 412, 431, and 432 can be determined so as to fit the aforementioned conductor (such as solder).

Figure 7:
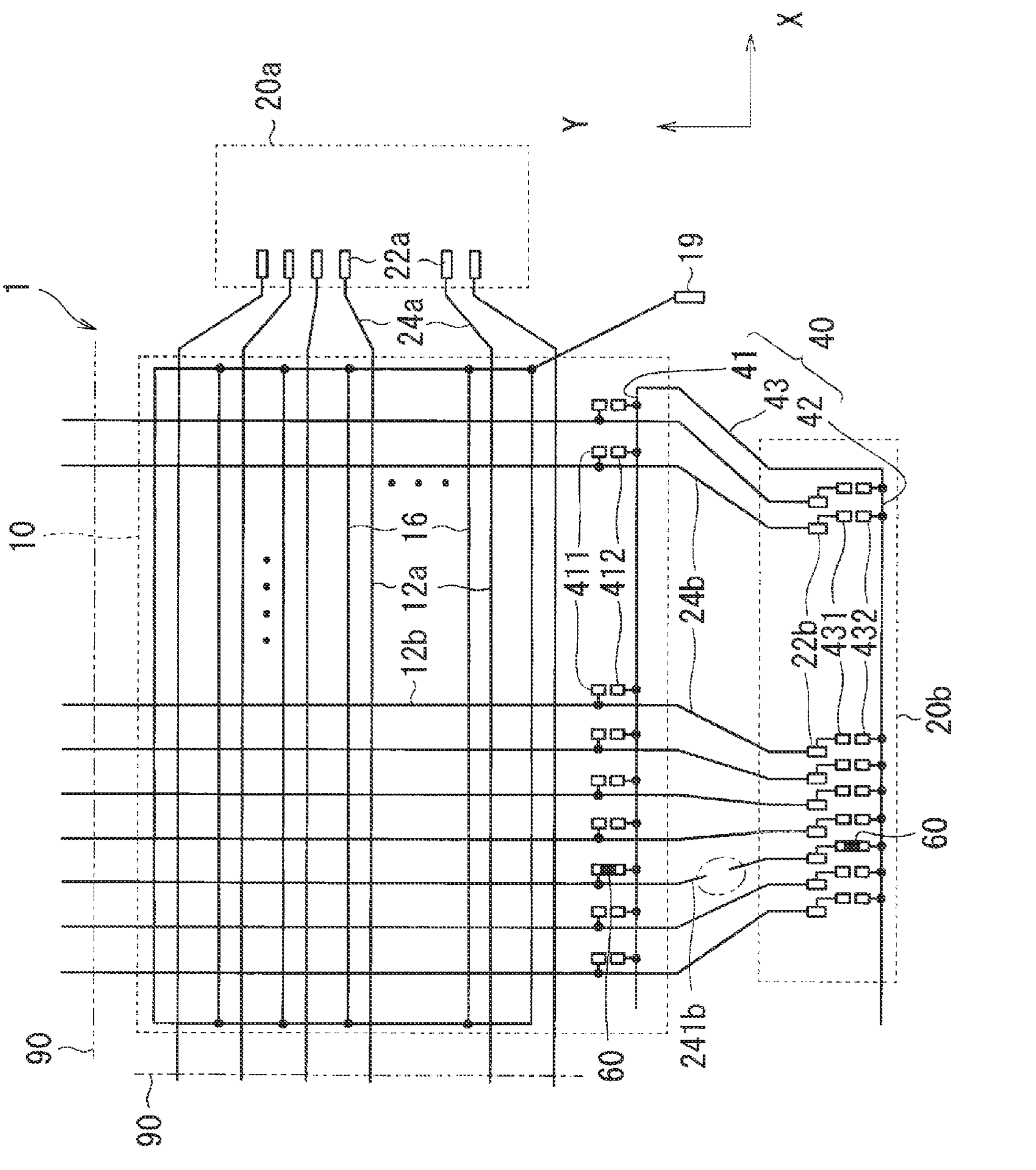

In the illustration of FIG. 6, if a break occurs in one of the leading lines 24*b*, a function of this leading line 24*b* is recovered as follows. As illustrated in FIG. 7, the repairing terminal 411 connected to the leading line 241*b* where the break occurs and the repairing terminal 412 corresponding to this repairing terminal 411 are electrically connected to each other with a conductor 60. More specifically, the conductor 60 is made to contact the repairing terminals 411 and 412 to electrically connect the repairing terminals 411 and 412. Likewise, the repairing terminal 431 connected to the leading line 241*b* and the repairing terminal 432 corresponding to this repairing terminal 431 are electrically connected to each other with the conductor 60. As a result, the source signal line 12*b* connected to the leading line 241*b* is connected through the repairing line 40 to the driving terminal 22*b*. Thus, a signal from the driving terminal 22*b* can be output to the source signal line 12*b* through the repairing line 40.

In the first embodiment, a laser is applied to fuse each of the repairing lines 41 and 42 in an upper layer and the leading line 24*b* in a lower layer while breaking the insulating layer 30, thereby electrically connecting each of the repairing lines 41 and 42 and the leading line 24*b*. This might cause splash of a line material or an insulating material, for example. In response to the occurrence of the splash or the like, a cleaning step should be conducted in some cases to remove the splash.

In the second embodiment, the repairing terminals 411 and 412 are connected with the conductor (such as solder) 60 and the repairing terminals 431 and 432 are connected with the conductor (such as solder) 60 as described above. This does not cause the aforementioned splash, so that manufacturing cost can be reduced.

Repairing process with a laser requires the repairing line 42 to extend so as to cross the leading line 24*b* with intervention of the insulating layer 30. In the second embodiment, the repairing line 42 is not required to cross the leading line 24*b*. Specifically, wiring of the repairing line 42 can be determined more flexibly. In the illustrations of FIGS. 6 and 7, the repairing line 42 does not cross the leading line 24*b* but it extends in a region on the opposite side of the leading lines 24*b* relative to the driving terminals 22*b*.

In the second embodiment, repairing terminals are provided to both the repairing lines 41 and 42. Alternatively, a repairing terminal may be provided to at least one of the repairing lines 41 and 42.

Third Embodiment

In the first or second embodiment, exposure of a part where the leading line 24*b* and the repairing line 40 are electrically connected (specifically, a repaired part) to the outside is not desirable in terms of reliability. A third embodiment is intended to seal a part to be repaired (hereinafter called a repairing process target part).

The repairing line 42 is described first. In the third embodiment, a repairing process target part of the repairing line 42 is arranged in the semiconductor chip mounting region 20*b*. Referring to FIG. 1, for example, the repairing line 42 extends so as to cross the leading line 24*b* in the semiconductor chip mounting region 20*b*. Specifically, an intersection of the repairing line 42 and the leading line 24*b* (repairing process target part) is placed inside the semiconductor chip mounting region 20*b*. In the illustration of FIG. 6, the repairing terminals 431 and 432 (repairing process target parts) are placed inside the semiconductor chip mounting region 20*b*.

Figure 8:
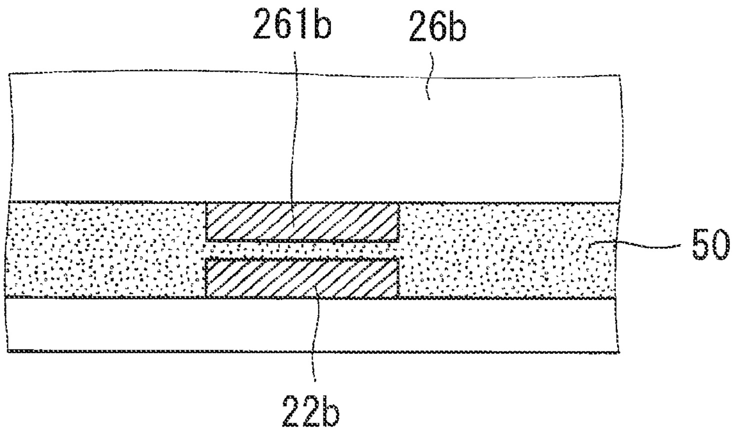
FIG. 8 is a sectional view showing a conceptual example of a driving terminal and that of a driver.

A source driver is arranged in the semiconductor chip mounting region 20*b*. FIG. 8 shows the cross section of a part of the array substrate 1 in a position passing through the driving terminal 22*b*. FIG. 8 shows only a part corresponding one driving terminal 22*b* in an enlarged manner.

A source driver 26*b* has an output terminal 261*b*. The output terminal 261*b* is arranged to face the driving terminal 22*b* in one to one relationship. The output terminal 261*b* includes a plurality of output terminals 261*b*. These output terminals 261*b* face the plurality of driving terminals 22*b*. An anisotropic conductive film 50 is interposed between the output terminal 261*b* and the driving terminal 22*b* facing each other.

The anisotropic conductive film 50 is made of a mixture of resin and conductive particles (such as metal particles).

As an example, the resin may be a thermosetting resin or a light curing resin. The source driver 26*b* is fixed in the semiconductor chip mounting region 20*b* with this resin. The conductive particles provide favorable electrical connection between the output terminal 261*b* and the driving terminal 22*b*.

The anisotropic conductive film 50 is provided to extend not only between the output terminal 261*b* and the driving terminal 22*b* but also extend through a region (semiconductor chip mounting region 20*b*) entirely where the source driver 26*b* is arranged. As a result, a repairing process target part is covered and sealed with the anisotropic conductive film 50.

A distance between different electrical elements inside the semiconductor chip mounting region 20*b* (such as a distance between the output terminals 261*b* or a distance between the output terminal 261*b* and the repairing line 42) is longer than a distance between the output terminal 261*b* and the driving terminal 22*b*. Thus, the anisotropic conductive film 50 does not hinder electrical insulation between these different electrical elements.

The anisotropic conductive film 50 is not always required to extend through the semiconductor chip mounting region 20*b* entirely. Alternatively, the anisotropic conductive film 50 may extend to surround the semiconductor chip mounting region 20*b*. This allows hermetic sealing of internal space between the source driver 26*b* and a substrate. A repairing process target part is formed in this internal space, so that it is to be sealed with the anisotropic conductive film 50.

As described above, the aforementioned structure achieves sealing of a repairing process target part of the repairing line 42, thereby enhancing reliability of wiring. Further, the aforementioned example does not require an additional sealing member dedicated to sealing a repairing process target part but makes the anisotropic conductive film 50 further function to seal the repairing process target part. This achieves reduction in manufacturing cost.

Figure 9:
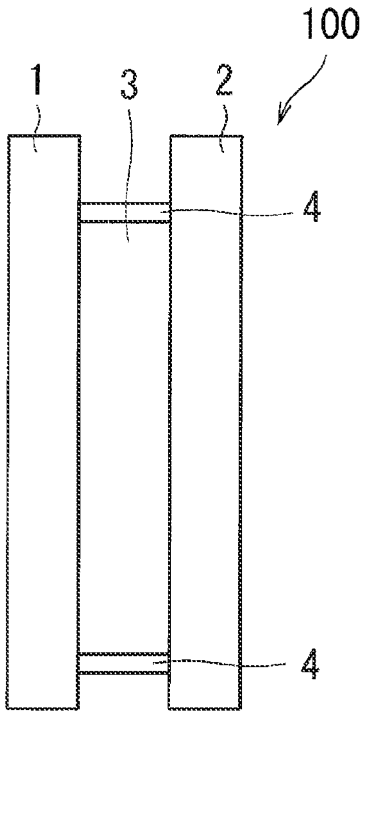
FIG. 9 is a sectional view showing a conceptual example of the display device.

The repairing line 41 is described next. A repairing process target part of the repairing line 41 can be sealed with a sealing member to seal a liquid crystal. FIG. 9 shows an example of a conceptual structure of a liquid crystal display device 100. The liquid crystal display device 100 includes the array substrate 1, an counter substrate 2, and a liquid crystal 3 interposed between the array substrate 1 and the counter substrate 2. The liquid crystal 3 is arranged in the display region 10 in a plan view. A sealing member 4 is provided to seal the liquid crystal 3. The sealing member 4 is provided to surround the liquid crystal 3, eventually surround the display region 10 between the array substrate 1 and the counter substrate 2.

A repairing process target part of the repairing line 41 is placed inside a region surrounded by the sealing member 4. In the illustration of FIG. 1, the repairing line 41 extends so as to cross the leading line 24*b* inside the display region 10. Specifically, an intersection of the repairing line 41 and the leading line 24*b* (repairing process target part) is placed inside the sealing member 4 in a plan view. In the illustration of FIG. 6, the repairing terminals 411 and 412 (repairing process target parts) are placed inside the display region 10. Specifically, the repairing terminals 411 and 412 are surrounded by the sealing member 4 in a plan view.

As a result, reliability of wiring is enhanced. Further, the aforementioned example does not require an additional sealing member dedicated to sealing a repairing process target part of the repairing line 41 but makes the sealing member 4 intended to seal the liquid crystal 3 further function to seal this repairing process target part. This achieves reduction in manufacturing cost.

A repairing process target part of the repairing line 41 is not always required to be surrounded by the sealing member 4 in a plan view. As an example, the repairing process target part may be arranged in a position overlapping the sealing member 4 in a plan view. In this case, the repairing process target part is covered and sealed with the sealing member 4.

In the third embodiment, only one of the repairing lines 41 and 42 may be required to be sealed by the corresponding method described above. The other of the repairing lines 41 and 42 may be sealed by a method different from the corresponding method described above. Even in this case, effect of one of the methods can still be achieved.

Fourth Embodiment

Referring to FIGS. 1 and 6, one repairing line 40 is provided to be responsive to all the leading lines 24*b*. More specifically, in the illustration of FIG. 1, each of the repairing lines 41 and 42 crosses all the leading lines 24*b*. Thus, any one of the leading lines 24*b* can be repaired in response to a break occurring in this leading line 24*b*. In the illustration of FIG. 6, the repairing terminals 411 and 431 are provided for each of all the leading lines 24*b*. Further, the repairing terminals 412 and 432 are provided for the repairing lines 41 and 42 respectively to be responsive to all the leading lines 24*b*. Thus, any one of the leading lines 24*b* can be repaired in response to a break occurring in this leading line 24*b*.

Figure 10:
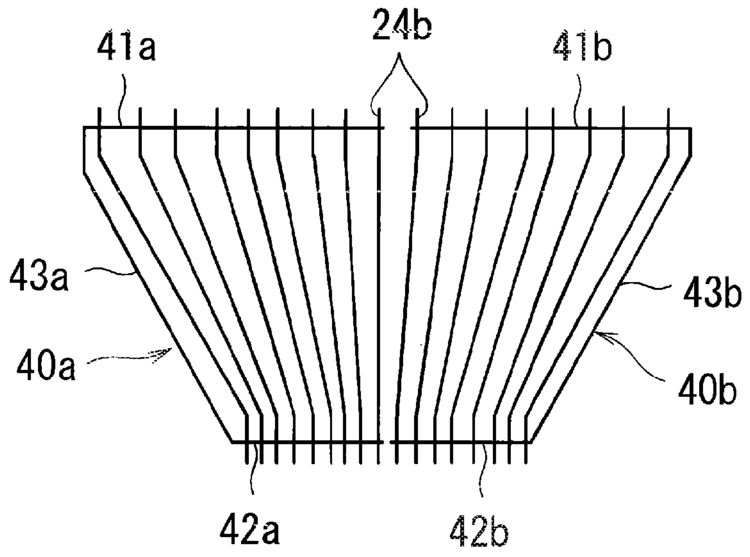
FIGS. 10 and 11 are plan views each conceptually showing an example of a leading line and that of a repairing line.

In a fourth embodiment, a plurality of leading line 24*b* are divided into a plurality of groups and the repairing line 40 is provided for each of these groups. FIG. 10 is a plan view schematically showing examples of the leading lines 24*b*, an example of a repairing line 40*a*, and that of a repairing line 40*b*.

The repairing line 40*a* includes a repairing line 41*a*, a repairing line 42*a*, and a repairing line 43*a*. The repairing line 41*a* extends so as to cross leading lines 24*b* in the left half of the plane of the sheet of the plurality of leading lines 24*b*. The repairing line 42*a* extends so as to cross the leading lines 24*b* in the left half of the plane of the sheet in a position closer to the driving terminals 22*b* (lower part of the plane of the sheet) than the repairing line 41*a*. The repairing line 43*a* extends on the left side of the plane of the sheet relative to a region where the plurality of leading lines 24*b* are arranged. The repairing line 43*a* connects the repairing lines 41*a* and 42*a*.

The repairing line 40*b* includes a repairing line 41*b*, a repairing line 42*b*, and a repairing line 43*b*. The repairing line 41*b* extends so as to cross leading lines 24*b* in the right half of the plane of the sheet of the plurality of leading lines 24*b*. The repairing line 42*b* extends so as to cross the leading lines 24*b* in the right half of the plane of the sheet in a position closer to the driving terminals 22*b* than the repairing line 41*b*. The repairing line 43*b* extends on the right side of the plane of the sheet relative to the region where the plurality of leading lines 24*b* are arranged. The repairing line 43*b* connects the repairing lines 41*b* and 42*b*.

According to the aforementioned structure, if a break occurs in one of the leading lines 24*b* in the left half, a function of this leading line 24*b* can be recovered as a result of repairing process using the repairing line 40*a*. Likewise, if a break occurs in one of the leading lines 24*b* in the right half, a function of this leading line 24*b* can be recovered as a result of repairing process using the repairing line 40*b*. This can increase the number of recoverable leading lines 24*b*.

Figure 11:
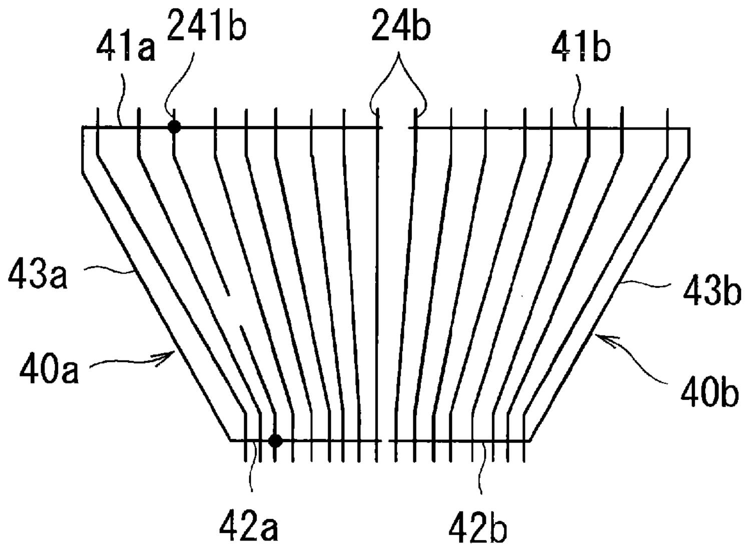

Additionally, the repairing lines 40*a* and 40*b* are shorter than the repairing line 40 of the first to third embodiments. Referring to FIG. 1, for example, if a break occurs in the leading line 241*b* in the left half of the plane of the sheet, a signal to flow through the leading line 241*b* travels a relatively long distance through the repairing line 40. Meanwhile, as shown in FIG. 11, if a break occurs in one of the leading lines 24*b* in the left half of the plane of the sheet (leading line 241*b*), a signal travels a relatively short distance through the repairing line 40*a*. This can suppress a signal delay further. FIG. 11 includes black circles indicating electrical connections between the leading line 241*b* and the repairing line 40*b*.

In the aforementioned example, the leading lines 24*b* are divided into two groups, the group in the right half and that in the left half. Meanwhile, groups of the leading lines 24*b* can be determined arbitrarily.

Fifth Embodiment

Figure 12:
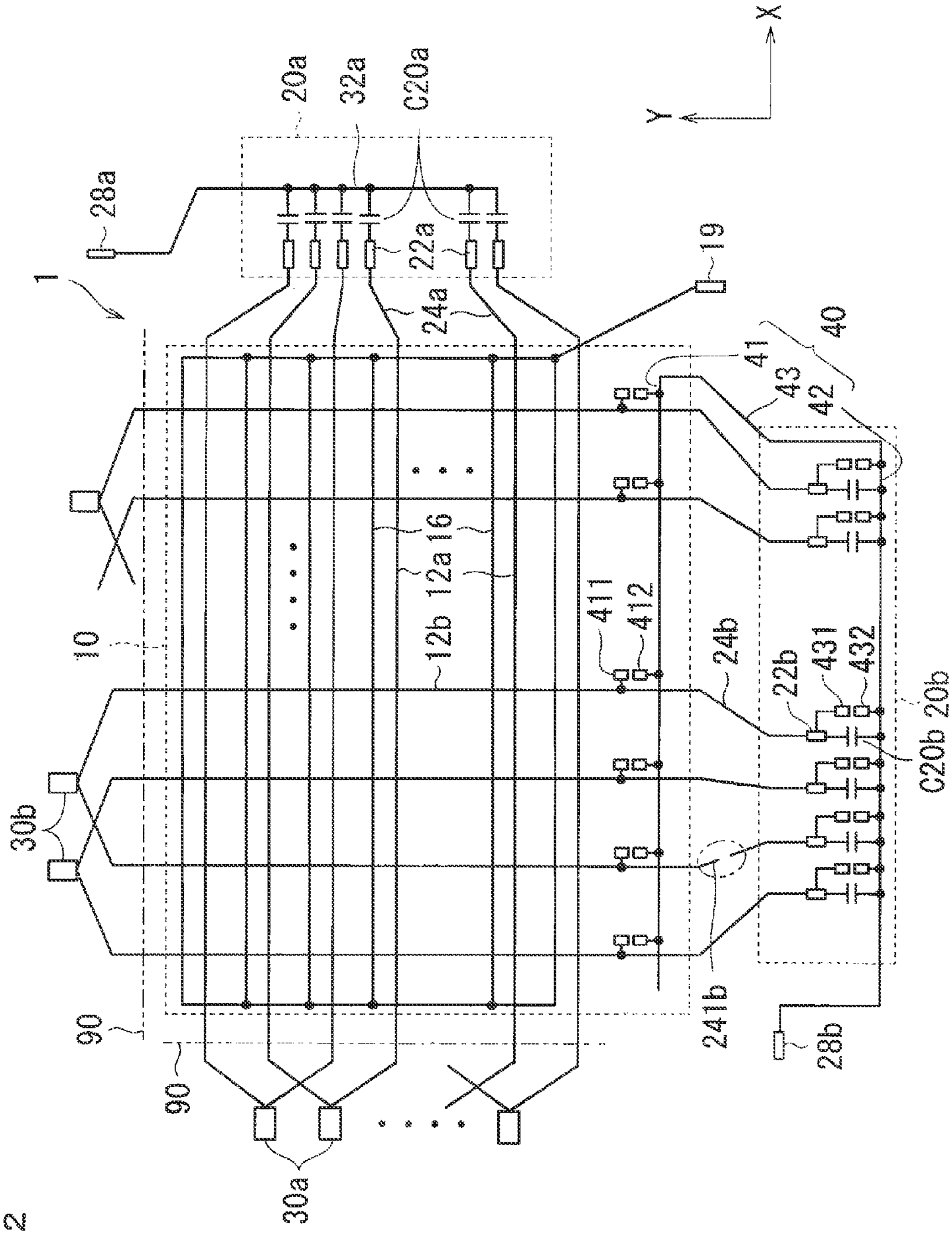
FIG. 12 conceptually shows an example of the circuit structure of the display device.

In a fifth embodiment, the array substrate 1 is provided with a structure intended to check a break in the source signal line 12*b* and the leading line 24*b*. FIG. 12 conceptually shows an example of a circuit structure on the array substrate 1 according to the fifth embodiment.

In comparison to the array substrate 1 of FIG. 6, the array substrate 1 of FIG. 12 further includes an array testing terminal 28*b* and an array testing terminal 30*b*. The array testing terminal 30*b* is connected to one end of the source signal line 12*b* on the opposite side of the leading line 24*b* relative to the display region 10. In the illustration of FIG. 12, the array testing terminal 30*b* includes a plurality of array testing terminals 30*b*. Two source signal lines 12*b* are commonly connected to each of the array testing terminals 30*b*. In the illustration of FIG. 12, a pair of the source signal lines 12*b* neighboring through another source line 12*b* is commonly connected to one of the array testing terminals 30*b*.

The array testing terminal 28*b* is connected to the repairing line 42. As an example, the array testing terminal 28*b* is connected to one end of the repairing line 42 (an end on the opposite side of the repairing line 43).

As shown in FIG. 12, each of the driving terminals 22*b* is connected to the repairing line 42 through a corresponding capacitance part C20*b*. The capacitance part C20*b* may be a capacitor. Alternatively, if the repairing line 42 and the leading line 24*b* cross each other through the insulating layer 30, an intersection of the repairing line 42 and this leading line 24*b* may function as the capacitance part C20*b*.

As described next, adopting the array substrate 1 enables a check for a break in the source signal lines 12*b* and the leading lines 24*b* with the array testing terminal 28*b* and the array testing terminals 30*b*. First, testing needles (probes) are pressed against the array testing terminal 28*b* and the array testing terminals 30*b*. Then, a first potential is applied to one array testing terminal 30*b* and a second potential different from the first potential is applied to the array testing terminal 28*b*. As an example, a DC power source is connected between this array testing terminal 30*b* and the array testing terminal 28*b*.

At this time, in the absence of a break in a path between this array testing terminal 30*b* and the array testing terminal 28*b*, a current flows in this path. In the illustration of FIG. 12, one array testing terminal 30*b* is connected to two source signal lines 12*b*. This forms two paths between this array testing terminal 30*b* and the array testing terminal 28*b*. Each of the paths is formed by the source signal line 12*b*, the leading line 24*b*, the driving terminal 22*b*, the capacitance part C20*b*, and the repairing line 42.

If a break occurs in one of these two paths, a current flows only in the other path. The value of this current is smaller than the value of a current flowing in the two paths. Thus, by detecting this current and determining that this current is smaller than a reference value, the occurrence of a break in one path can be determined. In the absence of flow of a current, the occurrence of breaks in both the paths can be determined. Such detection and determination can be done by a well-known tester with probes.

Meanwhile, the tester finds difficulty in determining which one of the two paths connected to the array testing terminal 30*b* suffers from a break. Thus, the tester does not specify a path but notifies an operator of both of these paths. The operator having received the notification visually checks these paths and specifies a location of the break.

The aforementioned test is conducted repeatedly by applying a potential to the plurality of array testing terminals 30*b* in order. Thus, all the source signal lines 12*b* and all the leading lines 24*b* can be subjected to check for a break.

As described above, adopting the array substrate 1 of the fifth embodiment enables a check for a break in the source signal lines 12*b* and the leading lines 24*b* using the array testing terminal 28*b*, the array testing terminals 30*b*, and the repairing line 42. This allows reduction in a circuit scale and manufacturing cost, compared to provision of a line (line dedicated to check for a break) different from the repairing line 42.

In the aforementioned example, the array testing terminal 30*b* is connected to two source signal lines 12*b*. Alternatively, the array testing terminal 30*b* may be connected to one source signal line 12*b* or three or more source signal lines 12*b*.

In the illustration of FIG. 12, an array testing terminal 28*a*, array testing terminals 30*a*, and a break checking line 32*a* are provided for check for a break in the gate signal lines 12*a* and the leading lines 24*a*. The break checking line 32*a* is connected to each driving terminal 22*a* through a corresponding capacitance part C20*a*. The array testing terminal 30*a* are each connected to the gate signal lines 12*a* on the opposite side of the leading lines 24*a* relative to the display region 10. The array testing terminal 28*a* is connected to one end of the break checking line 32*a* (an end on the opposite side of the driving terminals 22*a*).

Adopting the aforementioned structure enables check for a break in the gate signal lines 12*a* and the leading lines 24*a* in the same way as a check for a break in the source signal lines 12*b* and the leading lines 24*b*.

If a repairing line is provided for the leading lines 24*a*, a part of this repairing line can also be used as a break checking line.

The embodiments of the present invention can be combined freely or each of the embodiments can be modified or omitted where appropriate without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:

a plurality of first signal lines extending parallel to each other;

a plurality of second signal lines extending parallel to each other while crossing said plurality of first signal lines;

a pixel switching element provided at an intersection of each of said plurality of first signal lines and each of said plurality of second signal lines;

a plurality of driving terminals to receive signals to be input to said plurality of first signal lines;

a plurality of leading lines connecting said plurality of driving terminals and said plurality of first signal lines in one to one relationship, said plurality of leading lines being located between said plurality of first signal lines and said plurality of driving terminals; and a repairing line that includes a conductive part extending along with said plurality of leading lines, a first repairing part crossing at least one of said plurality of leading lines while being insulated from said at least one of said plurality of leading lines in a state in which repairing process is not conducted, and a second repairing part connected to said first repairing part through said conductive part and crossing said at least one of said plurality of leading lines or at least one of said plurality of driving terminals while being insulated from said at least one of said plurality of leading lines or said at least one of said plurality of driving terminals in a position closer to said plurality of driving terminals than said first repairing part in said state in which said repairing process is not conducted, wherein after said repairing process, said first repairing part is electrically connected to only one of said plurality of leading lines, and said second repairing part is connected to only one of said plurality of driving terminals corresponding to said one of said plurality of leading lines.

2. The display device according to claim 1, further comprising:

a driver including a plurality of output terminals electrically connected to said plurality of driving terminals; and an anisotropic conductive film interposed between said plurality of driving terminals and said plurality of output terminals, said anisotropic conductive film sealing a part at which said at least one leading line of said plurality of leading lines and said repairing line is connected to each other on said plurality of driving terminals side.

3. The display device according to claim 1, further comprising:

an array substrate provided with said plurality of first signal lines, said plurality of second signal lines, said pixel switching element, said plurality of driving terminals, said plurality of leading lines, and said repairing line;

a liquid crystal provided in a display region including said plurality of first signal lines, said plurality of second signal lines, and said pixel switching element;

a counter substrate, said liquid crystal being sandwiched and held between said counter substrate and said array substrate; and a sealing member surrounding said liquid crystal between said counter substrate and said array substrate, said sealing member sealing said liquid crystal and a part at which each end part of said at least one of said plurality of leading lines and said repairing line.

4. The display device according to claim 1, further comprising:

a first array testing terminal connected to said plurality of first signal lines on a side opposite said at least one leading lines of said plurality of leading lines; and a second array testing terminal connected to said repairing line.

5. The display device according to claim 1, wherein the repairing line further includes:

a first repairing part extending so as to cross at least two of said plurality of leading lines on said plurality of first signal lines side thereof; and a second repairing part extending in a region on said plurality of driving terminals side of said plurality of leading lines, and the repairing line is capable of electrically connecting said at least one of said plurality of driving terminals and said at least one of said plurality of leading lines on said plurality of first signal lines side thereof, through said first repairing part, second repairing part, and conductive part.

6. The display device according to claim 1, wherein the second repairing part passes across the at least two of said plurality of driving terminals by crossing the corresponding leading lines.

7. The display device according to claim 1, wherein the second repairing part passes across the at least two of said plurality of driving terminals in a region on an opposite side of said plurality of leading lines relative to said plurality of driving terminals.

8. A display device comprising:

a plurality of first signal lines extending parallel to each other;

a plurality of second signal lines extending parallel to each other while crossing said plurality of first signal lines;

a pixel switching element provided at an intersection of each of said plurality of first signal lines and each of said plurality of second signal lines;

a plurality of driving terminals to receive signals to be input to said plurality of first signal lines;

a plurality of leading lines connecting said plurality of driving terminals and said plurality of first signal lines in one to one relationship;

a repairing line that includes a conductive part extending along with said plurality of leading lines and is capable of electrically connecting at least one of said plurality of driving terminals and at least one of said plurality of leading lines at said plurality of first signal lines side thereof, through said conductive part, said at least one of said driving terminals and said at least one of said plurality of leading lines being corresponding to each other;

a first repairing terminal connected to each end part of said at least one of said plurality of leading lines on said plurality of first signal lines side; and a second repairing terminal connected to said at least one of said driving terminals, wherein said repairing line including:

a first terminal being capable of connecting to said first repairing terminal; and a second terminal being capable of connecting to said second repairing terminal.

9. The display device according to claim 8, further comprising:

a first array testing terminal connected to said plurality of first signal lines on a side opposite said at least one of said plurality of leading lines; and a second array testing terminal connected to said repairing line.

10. A display device comprising:

a plurality of first signal lines extending parallel to each other;

a plurality of second signal lines extending parallel to each other while crossing said plurality of first signal lines;

a pixel switching element provided at an intersection of each of said plurality of first signal lines and each of said plurality of second signal lines;

a plurality of driving terminals to receive signals to be input to said plurality of first signal lines;

a plurality of leading lines connecting said plurality of driving terminals and said plurality of first signal lines in one to one relationship;

a repairing line that includes a conductive part extending along with said plurality of leading lines and is capable of electrically connecting at least one of said plurality of driving terminals and at least one of said plurality of leading lines at said plurality of first signal lines side thereof, through said conductive part, said at least one of said driving terminals and said at least one of said plurality of leading lines being corresponding to each other; and a second repairing line that includes a second conductive part extending along with said plurality of leading lines and is capable of electrically connecting each end part of at least a second one of said plurality of leading lines on said plurality of first signal lines side and at least a second one of said plurality of driving terminals through said second conductive part, said at least second one of said plurality of driving terminals corresponding to said at least second one of said plurality of leading lines.

11. The display device according to claim 10, further comprising:

a first array testing terminal connected to said plurality of first signal lines on a side opposite said at least one of said plurality of leading lines; and a second array testing terminal connected to said repairing line.

* * * * *